UNITED STATES PATENT OFFICE.

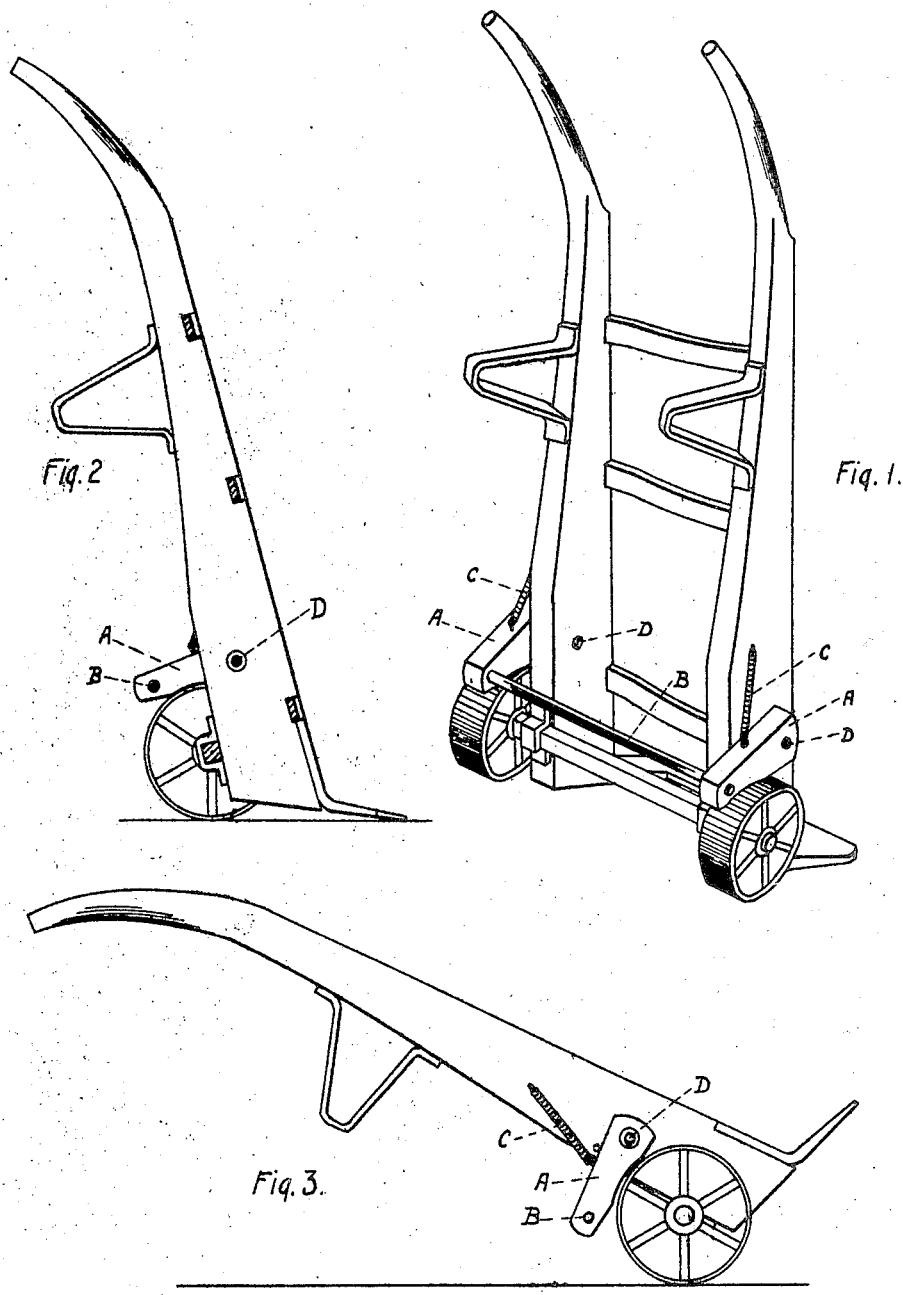

CHARLES E. BADGER AND FRED G. HALLADAY, OF APPLETON, WISCONSIN.

BRAKE FOR HAND-TRUCKS.

1,106,913.  Specification of Letters Patent.  Patented Aug. 11, 1914.

Application filed March 10, 1913. Serial No. 753,207.

*To all whom it may concern:*

Be it known that we, CHARLES E. BADGER and FRED G. HALLADAY, citizens of the United States, and residing at Appleton, in the county of Outagamie and State of Wisconsin, have invented certain new and useful Improvements in Brakes for Hand-Trucks, of which the following is a full and complete description of the invention, such as will enable others skilled in the art to which it appertains to make and use the same.

Our invention relates to and applies to the two-wheeled truck in common use in stores, factories, railway stations and wharves for the transportation of heavy merchandise, boxes or barrels; and its object is to provide in a novel and simple manner for preventing the backward movement of the truck in the effort of the operator to lift the load from the floor.

In the accompanying drawings the use and operation of the brake is fully set forth and described, similar letters of reference indicating like parts in each figure.

Figure 1 is a perspective view of a hand truck with our brake attached, in the position assumed when being loaded. Fig. 2 is a longitudinal section of the same in the same position. Fig. 3 is a side view in the position assumed when being drawn.

When the truck is being loaded the point is pushed under the load by applying the foot to the axle. By the use of our improvement the operator then places his foot upon the rod B, connecting the brake shoes A, which are attached to the truck frame by the bolts D, thus preventing the slipping of the truck as the operator throws his weight upon the handles to raise the load from the floor. When the operator removes his foot from the rod B, the spiral spring C, connecting the brake shoes with the truck frame, by screw eyes, release the shoes from contact with the wheels, and the truck is readily moved either forward or backward with the load.

It will be observed that by our invention the rod connecting the brake shoes is sufficiently high to enable the operator to easily push the axle with his foot in order to get the point of the truck under the load, while at the same time it may serve as a step to enable him to more easily reach across a large box in order to lift the load, the weight of the operator serving at the same time to so apply the brake that any slipping of the wheels is impossible. The extreme simplicity and lack of parts liable to break or get out of order in our improvement will also commend its novelty and usefulness.

Our improvement is applicable to any style or construction of trucks of the class described, and changes in and modifications of the construction of our improvement as herein shown and described may be made without departing from the spirit of our invention or sacrificing its advantages.

This improved device, while extremely simple and of few parts, has been found highly efficient for the purpose had in view.

What we claim is:

The combination with a two-wheeled truck, of a pair of hardwood shoes, attached by bolts to the side frame of the truck, the shoes connected by a rod, passing through the outer end of each shoe, which may be "up-set," or riveted at each end to hold it in position; with a spiral spring connecting each brake shoe with the side frame of the truck, the whole constructed and arranged substantially as and for the purpose herein set forth.

In testimony whereof we affix our signatures in the presence of the subscribing witnesses this 8th day of March, 1913.

CHAS. E. BADGER.
FRED G. HALLADAY.

Witnesses:
 DENNIS CARROLL,
 P. A. KORNELY.